(12) United States Patent
Zheng

(10) Patent No.: US 12,155,840 B2
(45) Date of Patent: Nov. 26, 2024

(54) VIDEO PROCESSING METHOD, VIDEO PROCESSING APPARATUS, SMART DEVICE, AND STORAGE MEDIUM

(71) Applicant: Tencent Technology (Shenzhen) Company Limited, Guangdong (CN)

(72) Inventor: Yushan Zheng, Shenzhen (CN)

(73) Assignee: Tencent Technology (Shenzhen) Company Limited, Shenzhen (CN)

(*) Notice: Subject to any disclaimer, the term of this patent is extended or adjusted under 35 U.S.C. 154(b) by 97 days.

(21) Appl. No.: 17/957,071

(22) Filed: Sep. 30, 2022

(65) Prior Publication Data

US 2023/0023369 A1    Jan. 26, 2023

Related U.S. Application Data

(63) Continuation of application No. PCT/CN2021/128311, filed on Nov. 3, 2021.

(30) Foreign Application Priority Data

Nov. 9, 2020  (CN) .......................... 202011239333.1

(51) Int. Cl.
*H04N 19/157*   (2014.01)
*H04N 19/119*   (2014.01)
(Continued)

(52) U.S. Cl.
CPC ......... *H04N 19/157* (2014.11); *H04N 19/119* (2014.11); *H04N 19/136* (2014.11);
(Continued)

(58) Field of Classification Search
CPC ...... H04N 19/44; H04N 19/65; H04N 19/105; H04N 19/107; H04N 19/176; H04N 19/895

See application file for complete search history.

(56) References Cited

U.S. PATENT DOCUMENTS 7,330,509 B2   2/2008  Lu et al.
7,356,084 B2   4/2008  Liu et al.
(Continued)

FOREIGN PATENT DOCUMENTS

CN       108322747 A     7/2018
CN       111107344 A     5/2020
(Continued)

OTHER PUBLICATIONS

International Search Report and Written Opinion issued Jan. 30, 2022 in International Application No. PCT/CN2021/128311 with English Translation (12 pages).
(Continued)

*Primary Examiner* — Tsion B Owens
(74) *Attorney, Agent, or Firm* — ArentFox Schiff LLP

(57) ABSTRACT

A video processing method is provided. A target video frame is obtained from a video. A target data block is determined from the target video frame. Data block indicator information of the target data block is determined based on a scene complexity of the target data block. The target data block is divided into a plurality of subdata blocks. Subblock indicator information of the subdata blocks are determined based on scene complexities of the subdata blocks. An encoding mode for the target data block is determined according to the data block indicator information and the subblock indicator information. The target data block is encoded according to the determined encoding mode.

16 Claims, 7 Drawing Sheets

(51) Int. Cl.
*H04N 19/136* (2014.01)
*H04N 19/154* (2014.01)
*H04N 19/172* (2014.01)
*H04N 19/176* (2014.01)
*H04N 19/463* (2014.01)

(52) U.S. Cl.
CPC ......... *H04N 19/154* (2014.11); *H04N 19/172* (2014.11); *H04N 19/176* (2014.11); *H04N 19/463* (2014.11)

(56) References Cited

U.S. PATENT DOCUMENTS

| | | | |
|---|---|---|---|
| 7,483,484 | B2 | 1/2009 | Liu et al. |
| 7,876,257 | B2 | 1/2011 | Vetro et al. |
| 7,983,496 | B2 | 7/2011 | Liu et al. |
| 8,085,852 | B2 | 12/2011 | Liu et al. |
| 8,238,442 | B2 | 8/2012 | Liu |
| 8,526,495 | B2 | 9/2013 | Liu et al. |
| 8,699,561 | B2 | 4/2014 | Liu et al. |
| 9,363,511 | B2 | 6/2016 | Zhang et al. |
| 9,769,472 | B2 | 9/2017 | Liu et al. |
| 9,788,019 | B2 | 10/2017 | Liu et al. |
| 10,397,569 | B2 | 8/2019 | Liu et al. |
| 10,511,834 | B2 | 12/2019 | Xu et al. |
| 10,542,253 | B2 | 1/2020 | Liu et al. |
| 10,567,752 | B2 | 2/2020 | Zhao et al. |
| 10,567,801 | B2 | 2/2020 | Zhao et al. |
| 10,575,013 | B2 | 2/2020 | Liu et al. |
| 10,582,195 | B2 | 3/2020 | Liu et al. |
| 10,609,384 | B2 | 3/2020 | Chen et al. |
| 10,609,402 | B2 | 3/2020 | Zhao et al. |
| 2012/0327998 | A1* | 12/2012 | Nilsson ............. H04N 19/166 375/E7.126 |
| 2017/0208334 | A1 | 7/2017 | Yoo et al. |
| 2019/0020875 | A1 | 1/2019 | Liu et al. |
| 2021/0227211 | A1* | 7/2021 | Liu .................. H04N 19/59 |
| 2022/0232248 | A1* | 7/2022 | Chen ................ H04N 19/13 |
| 2022/0279171 | A1* | 9/2022 | Lee .................. H04N 19/117 |
| 2023/0370585 | A1* | 11/2023 | Kang ................ G06T 7/248 |

FOREIGN PATENT DOCUMENTS

| | | | |
|---|---|---|---|
| CN | 111741313 | A | 10/2020 |
| CN | 111818332 | A | 10/2020 |
| CN | 112104867 | A | 12/2020 |

OTHER PUBLICATIONS

Hyo-Song Kim et al. "Fast CU Partitioning Algorithm for HEVC Using an Online-Learning-Based Bayesian Decision Rule" IEEE Transactions on Circuits and SystemsjcJr Video Technology, vol. 26, No. 1, Jan. 31, 2016, pp. 1-9.

Zhiguo Niu et al. "Moving Object Segmentation Method Based on Block in HEVC Compressed Domain", Computer Engineering and Applications, Sep. 29, 2015, with English Abstract, pp. 1-7.

Bross et al., "General Video Coding Technology in Responses to the Joint Call for Proposals on Video Compression With Capability Beyond HEVC," IEEE Transactions on Circuits and Systems for Video Technology, May 2020, vol. 30, No. 5, pp. 1226-1240.

Liu et al., "Global/Local Motion-Compensated Frame Interpolation for Low Bitrate Video," Image and Video Communications and Processing, Apr. 2000, vol. 3974, 12 pages.

Liu et al., "Hybrid global-local motion compensated frame interpolation for low bit rate video coding," Journal of Visual Communication and Image Representation, Mar. 2003, vol. 14, No. 1, pp. 61-79.

Liu et al., "Joint Temporal-Spatial Bit Allocation for Video Coding with Dependency," IEEE Transactions on Circuits and Systems for Video Technology, Jan. 2005, vol. 15, No. 1, pp. 15-26.

Liu et al., "Non-linear Motion-compensated Interpolation for Low Bit Rate Video," Application of Digital Image Processing XXIII, Dec. 2000, vol. 4115, 11 pages.

Liu et al., "Rectangular partitioning for Intra prediction in HEVC," Visual Communications and Image Processing, Nov. 2012, 6 pages.

Liu et al., "Joint temporal-spatial rate control for adaptive video transcoding," International Conference on Multimedia and Expo, ICME, Jul. 2003, pp. 225-228.

Lou et al., "Trick-play optimization for H.264 video decoding," Journal of Information Hiding and Multimedia Signal Processing, Sep. 2010, vol. 1 No. 2, 15 pages.

Zhang et al., "Intra mode coding in HEVC standard," Visual Communications and Image Processing, Nov. 2012, 6 pages.

* cited by examiner

VIDEO PROCESSING METHOD, VIDEO PROCESSING APPARATUS, SMART DEVICE, AND STORAGE MEDIUM

RELATED APPLICATIONS

The present application is a continuation of International Application No. PCT/CN2021/128311, entitled "VIDEO PROCESSING METHOD, VIDEO PROCESSING APPARATUS, SMART DEVICE, AND STORAGE MEDIUM" and filed on Nov. 3, 2021, which claims priority to Chinese Patent Application No. 202011239333.1, entitled "VIDEO PROCESSING METHOD, VIDEO PROCESSING APPARATUS, SMART DEVICE, AND STORAGE MEDIUM" and filed on Nov. 9, 2020. The entire disclosures of the prior applications are hereby incorporated by reference in their entirety.

FIELD OF THE TECHNOLOGY

This application relates to the technical field of computers, including to a video processing method, a video processing apparatus, a smart device, and a computer-readable storage medium.

BACKGROUND OF THE DISCLOSURE

Video encoding technology is widely used in scenarios such as a video session or video on demand. For example, a video session involved in a video session scenario is processed by the video encoding technology, and an on-demand video involved in a video-on-demand scenario is processed by the video encoding technology, and the like. The video encoding technology may refer to a technology of compressing and encoding a video according to an encoding mode. By compressing and encoding a video, the storage space of the video can be effectively saved and the video transmission efficiency can be effectively improved.

In a video encoding process, determination of an appropriate encoding mode and encoding of a video according to the encoding mode can accelerate the video encoding process and improve video encoding efficiency. Therefore, how to determine an encoding mode for video frame encoding in a video encoding process has become an important topic for current research.

SUMMARY

Embodiments of this disclosure include a video processing method, an apparatus, device, and a non-transitory computer-readable storage medium, which can more accurately select an appropriate encoding mode to perform video frame encoding for example.

An aspect of the embodiments of this disclosure provides a video processing method. A target video frame is obtained from a video. A target data block is determined from the target video frame. Data block indicator information of the target data block is determined based on a scene complexity of the target data block. The target data block is divided into a plurality of subdata blocks. Subblock indicator information of the subdata blocks are determined based on scene complexities of the subdata blocks. An encoding mode for the target data block is determined according to the data block indicator information and the subblock indicator information. The target data block is encoded according to the determined encoding mode.

Another aspect of the embodiments of this disclosure provides a video processing apparatus, including processing circuitry. The processing circuitry is configured to obtain a target video frame from a video, and determine a target data block from the target video frame. The processing circuitry is configured to determine data block indicator information of the target data block based on a scene complexity of the target data block, and divide the target data block into a plurality of subdata blocks. The processing circuitry is configured to determine subblock indicator information of the subdata blocks based on scene complexities of the subdata blocks, and determine an encoding mode for the target data block according to the data block indicator information and the subblock indicator information. Further, the processing circuitry is configured to encode the target data block according to the determined encoding mode.

Another aspect of the embodiments of this disclosure provides a smart device, the smart device including a processor and a memory. The processor is configured to implement a computer program. The memory, stores a computer program, the computer program, when executed by the processor, implementing the foregoing video processing method.

According to another aspect, an embodiment of this disclosure provides a non-transitory computer-readable storage medium, storing instructions which when executed by a processor cause the processor to implement the foregoing video processing method.

According to another aspect, an embodiment of this disclosure provides a computer program product or a computer program, the computer program product or the computer program including computer instructions, the computer instructions being stored in a computer-readable storage medium. A processor of a computer device reads the computer instructions from the computer-readable storage medium, and executes the computer instructions, to implement the foregoing video processing method.

BRIEF DESCRIPTION OF THE DRAWINGS

To describe technical solutions of this disclosure more clearly, the following briefly describes the accompanying drawings for describing exemplary embodiments. The accompanying drawings in the following description show some embodiments of this disclosure. Other embodiments are within the scope of this disclosure.

DESCRIPTION OF EMBODIMENTS

Figure 1A:
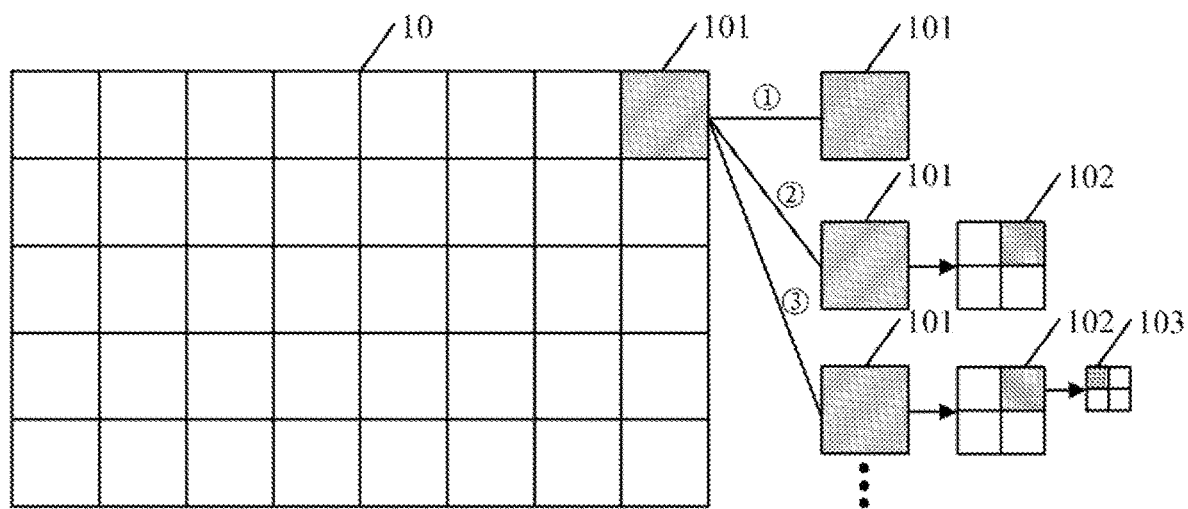
FIG. 1a is a schematic diagram of a recursive division process of a video frame according to an embodiment of this disclosure.

The following describes technical solutions in exemplary embodiments of this disclosure with reference to the accompanying drawings. The described embodiments are merely some but not all of the embodiments of this disclosure. Other embodiments are within the protection scope of this disclosure.

Embodiments of this disclosure may relate to cloud technology, and the embodiments of this disclosure may implement a video processing process by using the cloud technology. The cloud technology is, for example, a hosting technology that unifies a series of resources such as hardware, software, and networks in a wide area network or a local area network to implement computing, storage, processing, and sharing of data. The cloud technology is a collective name of a network technology, an information technology, an integration technology, a management platform technology, an application technology, and the like based on an application of a cloud computing business mode, and may form a resource pool, which is used as required, and is flexible and convenient. The cloud computing technology becomes an important support. A background service of a technical network system requires a large amount of computing and storage resources, such as video websites, image websites, and more portal websites. As the Internet industry is highly developed and applied, each article may have its own identifier in the future and needs to be transmitted to a background system for logical processing. Data at different levels are separately processed, and data in various industries may require strong system support, which may necessitate implementation through cloud computing.

Cloud computing may refer to a computing mode, in which computing tasks are distributed on a resource pool formed by a large quantity of computers, so that various application systems can obtain computing power, storage space, and information services according to requirements. A network that provides resources may be referred to as a "cloud". For a user, resources in a "cloud" may seem to be infinitely expandable, and can be obtained readily, used on demand, expanded readily, and paid for use. A basic capability provider of the cloud computing may establish a cloud computing resource pool (referred to as a cloud platform for short), commonly known as a Infrastructure as a Service (IaaS) platform, and deploy various types of virtual resources in the cloud computing resource pool for external customers to choose and use. The cloud computing resource pool may mainly include: a computing device (a virtualized machine, including an operating system), a storage device, and a network device. According to logical function division, a Platform as a Service (PaaS) layer may be deployed on an IaaS layer and a Software as a Service (SaaS) layer may be then deployed on the PaaS layer, or the SaaS may be directly deployed on the IaaS. The PaaS is a platform on which software (e.g., a database, a web container, and the like) runs. The SaaS is a variety of types of service software (e.g., a web portal, an SMS group sender, and the like). In general, the SaaS and the PaaS are upper layers relative to the IaaS. The cloud computing may also refer to a delivery and use mode of an Internet Technology (IT) infrastructure and refer to obtaining a required resource through a network in an on-demand and easily scalable manner. Broadly defined cloud computing may refer to a delivery and use mode of a service and refer to obtaining a required service through a network in an on-demand and easily scalable manner. Such the service may be IT and software and be correlated with the Internet, or may be another service. The cloud computing may be a product of integration of related computer and network technologies such as grid computing, distributed computing, parallel computing, utility computing, network storage technologies, virtualization, and load balance.

Cloud computing may be used in the field of cloud conferencing, which can be an efficient, convenient, and low-cost conference form based on the cloud computing technology. Users can quickly and efficiently share voice, data files, and videos with teams and customers around the world only by carrying out simple and easy-to-use operations through an Internet interface, and a cloud conference service provider helps the users to operate complex technologies such as data transmission and processing in the conference. At present, domestic cloud conferences are mainly focused on service content with a SaaS mode as the main body, including service forms such as a call, a network, and a video. Cloud-based video conferencing may be referred to as cloud conferencing. In the era of the cloud conferencing, transmission, processing, and storage of data are all processed by computer resources of a video conferencing manufacturer. Users do not need to purchase expensive hardware and install complicated software, and they can carry out an efficient remote conference only by opening a browser and logging into a corresponding interface. The cloud conference system supports multi-server dynamic cluster deployment and provides a plurality of high-performance servers, thereby greatly improving the conference stability, security, and availability. In recent years, video conferencing has been welcomed by many users because it can greatly improve the communication efficiency, continuously reduce the communication costs, and bring about upgrading of the internal management level, and has been widely used in various fields such as government, traffic, transportation, finance, operators, education, and enterprises. There is no doubt that after the use of cloud computing, video conferencing has a stronger attraction in terms of convenience, quickness, and ease of use, which may stimulate the arrival of a new upsurge of video conferencing applications.

Embodiments of this disclosure relate to a video. The video includes, for example, a video frame sequence of consecutive video frames. Due to the visual persistence effect of human eyes, in a case that the video frame sequence is played at a specific speed, what we see is a video with consecutive actions. Due to similarities between consecutive video frames, there can be a great amount of redundant information inside each video frame and between consecutive video frames. Therefore, before storing or transmitting a video, the video may be encoded by a video encoding technology, to remove redundant information of the video in dimensions of space, time, and/or the like, so as to save storage space and/or improve video transmission efficiency.

Figure 1B:
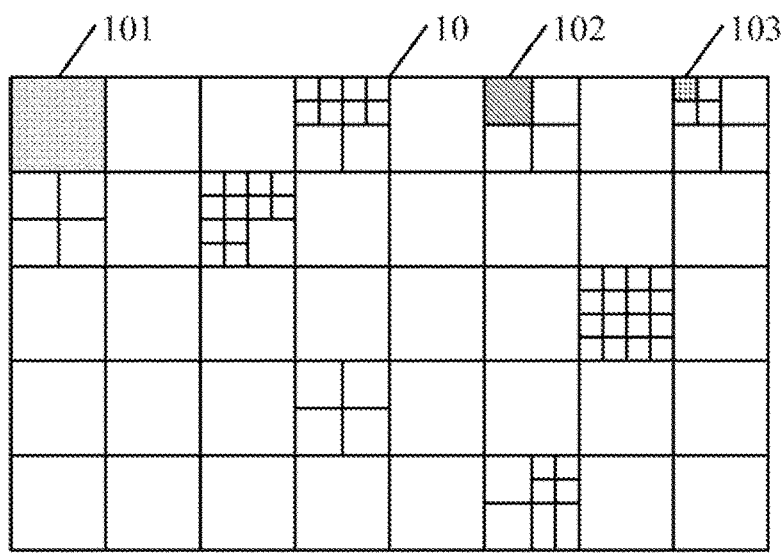
FIG. 1b is a schematic diagram of a division result of a video frame according to an embodiment of this disclosure.

Video encoding technology includes video compression technology, which may include a technology of compressing and encoding each video frame in a video according to an encoding mode. Further, in a process of encoding a video, each video frame in the video is recursively divided into data blocks of a plurality of sizes, and then each divided data block is then inputted to an encoder for encoding. The following describes an exemplary recursive division process involved in the embodiments of this disclosure in combination with FIG. 1*a*. FIG. 1*a* is a schematic diagram of a recursive division process of a video frame according to an embodiment of this disclosure. As shown in FIG. 1a, a video frame 10 is composed of, or includes, a plurality of data blocks 101 of a first size. The method for recursively dividing the video frame 10 may include: (1) the data blocks 101 of the first size are directly inputted to an encoder for encoding, that is, the data blocks 101 of the first size are not divided and the data blocks of the first size are directly inputted to the encoder for encoding; (2) a data block 101 of the first size is divided into four data blocks 102 of a second size, the data blocks 102 of the second size are not further divided, and the data blocks 102 of the second size are inputted to the encoder for encoding; (3) a data block 102 of the second size is further divided, four data blocks 103 of a same size, namely, a third size, are obtained after division, the data blocks 103 of the third size are not further divided, and the data blocks 103 of the third size are inputted to the encoder for encoding. By analogy, a data block 103 of the third size may be further divided, so that the video frame 10 is recursively divided into data blocks of various sizes, and a division result of the video frame 10 may be referred to FIG. 1b. FIG. 1b is a schematic diagram of a division result of a video frame according to an embodiment of this disclosure. As shown in FIG. 1b, the divided video frame 10 is composed of data blocks of three sizes, namely, the data blocks 101 of the first size, the data blocks 102 of the second size, and the data blocks 103 of the third size.

In an actual video encoding process, division strategies of a plurality of data blocks included in a video frame may be different, encoding modes for encoding the video frame may also be different, and the encoding speed for the video frame also varies. Embodiments of this disclosure include a video processing solution, which provides two different data block division strategies, respectively, a top-down data block division strategy and a bottom-up data block division strategy. Both the two data block division strategies can determine an optimal division method for each data block in a video frame. The optimal division method may be understood as that the encoding quality is good and the encoding bit rate is low during encoding of data blocks obtained after dividing a data block according to the data block division method. The encoding bit rate may refer to an amount of data transmitted per unit time (e.g., 1 second) in a case that a video data stream obtained after encoding is transmitted. A greater amount of data transmitted per unit time indicates a higher encoding bit rate. The following separately describes the two data block division strategies in further detail.

(1) Top-Down Data Block Division Strategy

In a process of encoding a video, each data block in a video frame is recursively divided from top to bottom. Further, the top-down recursive division may refer to a process of dividing from a maximum size of data blocks in a video frame to a minimum size of the data blocks in the video frame, until an optimal division method for the data blocks is found. For example, a maximum size of data blocks in a video frame is 64 px (pixel)×64 px and a minimum size of the data blocks in the video frame is 4 px×4 px. The maximum size of the data blocks being 64 px×64 px and the minimum size of the data blocks being 4 px×4 px are used for example purposes only and do not constitute a limitation to the embodiments of this disclosure. For example, the maximum size of the data blocks may be 128 px×128 px and the minimum size of the data blocks may be 8 px×8 px, and the like. One 64 px×64 px data block may be divided into four 32 px×32 px data blocks. A Rate-Distortion Cost (RDCost) of encoding each of the four 32 px×32 px data blocks is calculated, a sum of the RDCosts of the four 32 px×32 px data blocks is calculated e.g., a first sum RDCost of the four 32 px×32 px data blocks is calculated), and a RDCost of directly encoding the 64 px×64 px data block is calculated. In a case that the first sum RDCost is greater than the RDCost of the 64 px×64 px data block, it is determined that a division size of the data block is 64 px×64 px, that is, there is no need to divide the 64 px×64 px data block; and in a case that the first sum RDCost is less than or equal to the RDCost of the 64 px×64 px data block, it is determined that a division size of the data blocks is 32 px×32 px. Subsequently, a 32 px×32 px data block may further be divided into four 16 px×16 px data blocks for encoding, and by analogy, until an optimal division method for the data blocks is found. By the top-down data block division strategy, usually the optimal division method can be determined relatively accurately. For a data block having a low scene complexity, the optimal division size of the data block is relatively large, and therefore for the data block having a low scene complexity, the optimal division method for the data block can be quickly determined by the top-down data block division strategy. For a data block having a high scene complexity, the optimal division size of the data block is relatively small, and therefore for the data block having a high scene complexity, the process of determining the optimal division method for the data block by the top-down data block division strategy requires a great amount of time and cost, further affecting the encoding speed of the data block.

The optimal division size of the data block may be understood as that the encoding quality is good and the encoding bit rate is low during encoding of data blocks that are obtained after division in a case that the size of the data blocks obtained after division is the size. Generally, the optimal division size corresponding to a data block having a low scene complexity is relatively large, and the optimal division size corresponding to a data block having a high scene complexity is relatively small. The scene complexity of a data block may be measured by a method such as using spatial information (SI) or temporal information. The spatial information may be used for representing an amount of spatial details of a data block, and a greater quantity of elements included in a data block indicates a higher value of the spatial information of the data block and indicates a higher scene complexity of the data block. For example, a data block A includes five elements (a cat, a dog, a tree, a flower, and a sun), a data block B includes two elements (a cat and a dog), the data block A includes more elements than the data block B, and therefore, a value of spatial information of the data block A is higher than that of spatial information of the data block B and a scene complexity of the data block A is higher than that of the data block B. The temporal information may be used for representing an amount of temporal variation of a data block, and a higher degree of motion of a target data block in a target video frame which is currently processed relative to a reference data block in a reference video frame of the target video frame indicates a greater value of the temporal information of the target data block and indicates a higher scene complexity of the target data block. The reference video frame is a video frame in the video frame sequence whose encoding order is before the target video frame, and a position of the target data block in the target video frame is the same as that of the reference data block in the reference video frame. For example, the target data block includes one element (e.g., an automobile element), the reference data block also includes the element, and a greater displacement of the automobile element in the target data block relative to the automobile element in the reference data block indicates a higher degree of motion of the target data block in the target video frame relative to the reference data block in the reference video frame, indicates a greater value of the temporal information of the target data block, and indicates a higher scene complexity of the target data block.

(2) Bottom-Up Video Frame Division Strategy

In a process of encoding a video, each data block in a video frame is recursively divided from bottom to top. Further, the bottom-up recursive division may refer to a process of dividing from a minimum size of data blocks in a video frame to a maximum size of the data blocks in the video frame, until an optimal division method for the data blocks is found. For example, a minimum size of data blocks in a video frame is 4 px×4 px and a maximum size of the data blocks in the video frame is 64 px×64 px. Each of the four 4 px×4 px data blocks is encoded separately, then an 8 px×8 px data block composed of four 4 px×4 px data blocks is encoded, a RDCost for encoding each of the four 4 px×4 px data blocks is calculated separately, and a sum of the RDCosts of the four 4 px×4 px data blocks is calculated (e.g., a second sum of RDCosts of the four 4 px×4 px data blocks is calculated); and a RDCost for encoding an 8 px×8 px data block is calculated. In a case that the second sum RDCost is less than, or in some cases equal to, the RDCost of the 8 px×8 px data block, it is determined that a division size of the data block is 4 px×4 px; and in a case that the second sum RDCost is greater than, or in some cases equal to, the RDCost of the 8 px×8 px data block, it is determined that a division size of the data block is 8 px×8 px. Subsequently, a 16 px×16 px data block composed of four 8 px×8 px data blocks may be continuously encoded, and by analogy, until an optimal division method for the data block is found. By the bottom-up video frame division strategy, usually the optimal division method can be determined relatively accurately. For a data block having a high scene complexity, the optimal division size of the data block is relatively small, and therefore for the data block having a high scene complexity, the optimal division method for the data block can be quickly determined by the bottom-up video frame division strategy. For a data block having a low scene complexity, the optimal division size of the data block is relatively large, and therefore for the data block having a low scene complexity, the process of determining the optimal division method for the data block through the bottom-up video frame division strategy requires a great amount of time and cost, further affecting the encoding speed of the data block.

Hence, by the top-down data block division strategy and the bottom-up video frame division strategy, usually the optimal division method for each data block in a video frame can be determined relatively accurately. The top-down data block division strategy is more suitable for a data block having a low scene complexity and the bottom-up video frame division strategy is more suitable for a data block having a high scene complexity.

On this basis, the embodiments of this disclosure provide a further video processing solution, by which scene complexity analysis is performed on a to-be-encoded target data block in a to-be-encoded video frame; the target data block is divided into a plurality of subdata blocks and scene complexity analysis is performed on each subdata block; and according to a scene complexity analysis result of the target data block and a scene complexity analysis result of each of the plurality of subdata blocks obtained after division, a relatively optimal division method for the target data block is determined, and further an encoding mode for the target data block is determined, so that the target data block may be encoded according to the determined encoding mode. The scene complexity analysis in the embodiments of this disclosure may be performed by any scene complexity analysis method in the related art, for example, a Sum of Squared Error (SSE) method, a Sum of Absolute Difference (SAD) method, and the like. The relatively optimal division method mentioned in the embodiments of this disclosure may refer to a data block division method which can improve the encoding speed to an extent while achieving a balance between the encoding quality and the encoding bit rate. By the video processing solution, an encoding mode suitable for a scene complexity of a target data block can be formulated according to the scene complexity of the target data block, effectively improving the encoding speed of the target data block, thereby improving the video encoding speed; in addition, the video processing solution is more universal and suitable for any video encoding scenario, and by the video processing solution, not only an encoding mode suitable for a data block having a low scene complexity can be determined, but also an encoding mode suitable for a data block having a high scene complexity can be determined.

Figure 2:
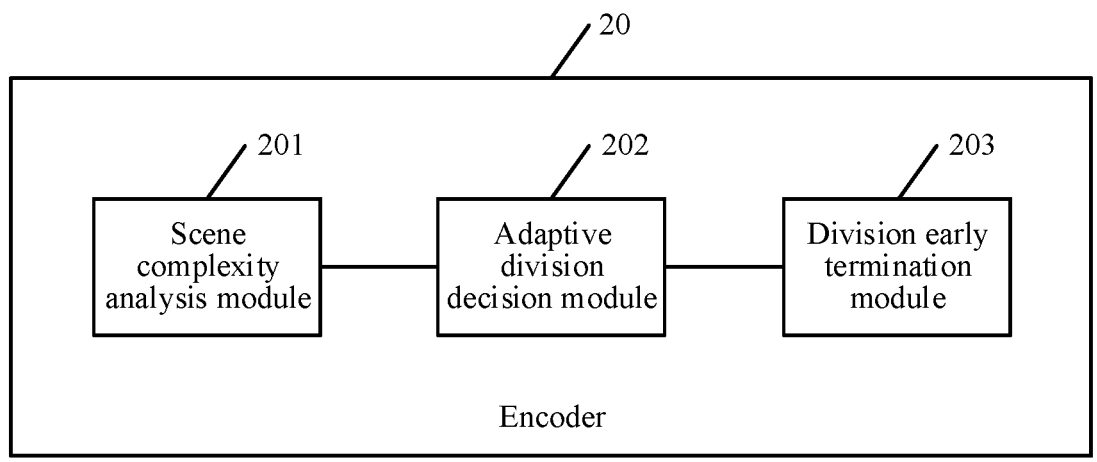
FIG. 2 is a schematic structural diagram of an encoder according to an embodiment of this disclosure.

Based on the foregoing description, embodiments of this disclosure include an encoder, which may be configured to implement the foregoing video processing solution. In an example, a video encoder may be an Alliance for Open Media Video 1 (AV1) standard encoder. FIG. 2 is a schematic structural diagram of an encoder according to an embodiment of this disclosure. As shown in FIG. 2, an encoder 20 includes a scene complexity analysis module 201, an adaptive division decision module 202, and a division early termination module 203. One or more modules, submodules, and/or units of the encoder can be implemented by processing circuitry, software, or a combination thereof, for example.

The scene complexity analysis module 201 may be configured to perform scene complexity analysis on a to-be-encoded target data block in a to-be-encoded video frame, to obtain data block indicator information. The scene complexity analysis module 201 may also be configured to divide the target data block into N subdata blocks and perform scene complexity analysis on each of the N subdata blocks, to obtain subblock indicator information, N being an integer greater than or equal to 2. In an actual encoding scenario, a value of N is generally 4, which is not limited in this embodiment of this disclosure. In some embodiments, other values of N may be utilized. Dividing the target data block into N subdata blocks may refer to dividing the target data block into four subdata blocks of a same size for example.

Figure 3:
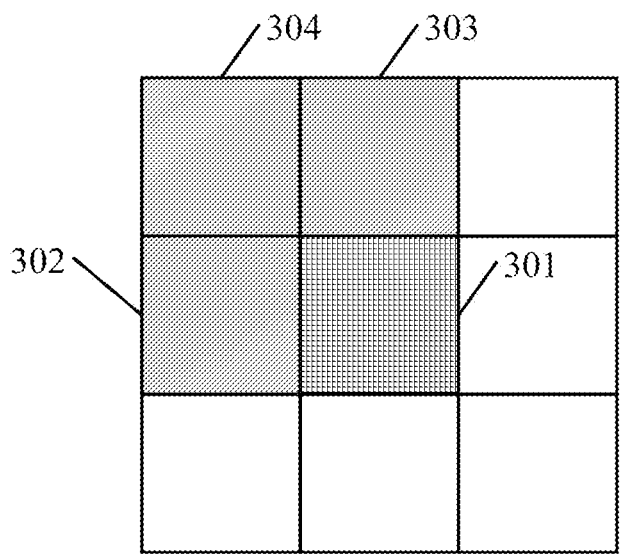
FIG. 3 is a schematic diagram of an associated data block according to an embodiment of this disclosure.

The adaptive division decision module 202 may be configured to determine an encoding mode for the target data block according to the data block indicator information and the subblock indicator information. The encoding mode may include any of a first mode or a second mode, that is, the adaptive division decision module 202 may determine that the encoding mode for the target data block is the first mode or the second mode according to the data block indicator information and the subblock indicator information. The first mode may refer to an encoding mode in which a data block is divided into N subdata blocks and each of the N subdata blocks is encoded separately; and the second mode may refer to an encoding mode in which a target data block is not divided and the target data block is directly encoded. In a case that the adaptive division decision module 202 cannot determine the encoding mode for the target data block according to the data block indicator information and the subblock indicator information, the adaptive division decision module 202 may also be configured to obtain associated block indicator information of M associated data blocks correlated with the target data block, and determine an attempt encoding order for the target data block according to the associated block indicator information, M being a positive integer. In an actual encoding scenario, a value of M is generally 3, which is not limited in this embodiment of this disclosure. FIG. 3 is a schematic diagram of an associated data block according to an embodiment of this disclosure. As shown in FIG. 3, the M associated data blocks correlated with the target data block may refer to an associated data block 302 at a left position of a target data block 301, an associated data block 303 at a top position of the target data block 301, and an associated data block 304 at a left upper position of the target data block 301. The attempt encoding order may include any of a first attempt encoding order or a second attempt encoding order, that is, the adaptive division decision module 202 may determine that the attempt encoding order for the target data block is the first attempt encoding order or the second attempt encoding order according to the associated block indicator information. The first attempt encoding order may refer to an encoding order of first attempting to encode the target data block according to the first mode and then attempting to encode the target data block according to the second mode; and the second attempt encoding order may refers to an encoding order of first attempting to encode the target data block according to the second mode and then attempting to encode the target data block according to the first mode.

The division early termination module 203 is configured to set, in a case that the adaptive division decision module 202 cannot determine the encoding mode for the target data block, a division termination condition and determine the encoding mode for the target data block according to the set division termination condition. Further, in a case that the adaptive division decision module 202 determines that the attempt encoding order for the target data block is the first attempt encoding order, the division early termination module 203 obtains encoding information of N subdata blocks obtained by encoding the target data block according to the first mode, and in a case that the encoding information of the N subdata blocks meets a first division termination condition (e.g., a fifth condition below), the division early termination module 203 determines that the encoding mode for the target data block is the first mode. In a case that the adaptive division decision module 202 determines that the attempt encoding order for the target data block is the second attempt encoding order, the division early termination module 203 obtains encoding information of the target data block obtained by encoding the target data block according to the second mode, and in a case that the encoding information of the target data block meets a second division termination condition (e.g., a sixth condition below), the division early termination module 203 determines that the encoding mode for the target data block is the second mode.

The encoder 20 shown in FIG. 2 can formulate an encoding mode suitable for a scene complexity of a target data block according to the scene complexity of the target data block, to improve the encoding speed of the target data block, thereby improving the video encoding speed. In addition, the division early termination module 203 in the encoder 20 can determine the encoding mode for the target data block in a case that the encoding information meets a division termination condition, and terminate further division of the target data block, so that the encoding speed of the target data block is further improved while achieving a balance between the encoding speed of the target data block and the encoding bit rate, and that the video encoding efficiency is further improved. The video processing solution provided in the embodiments of this disclosure and the specific application scenario of the encoder 20 provided in the embodiments shown in FIG. 2 are described below with reference to the video processing system shown in FIG. 4.

Figure 4:
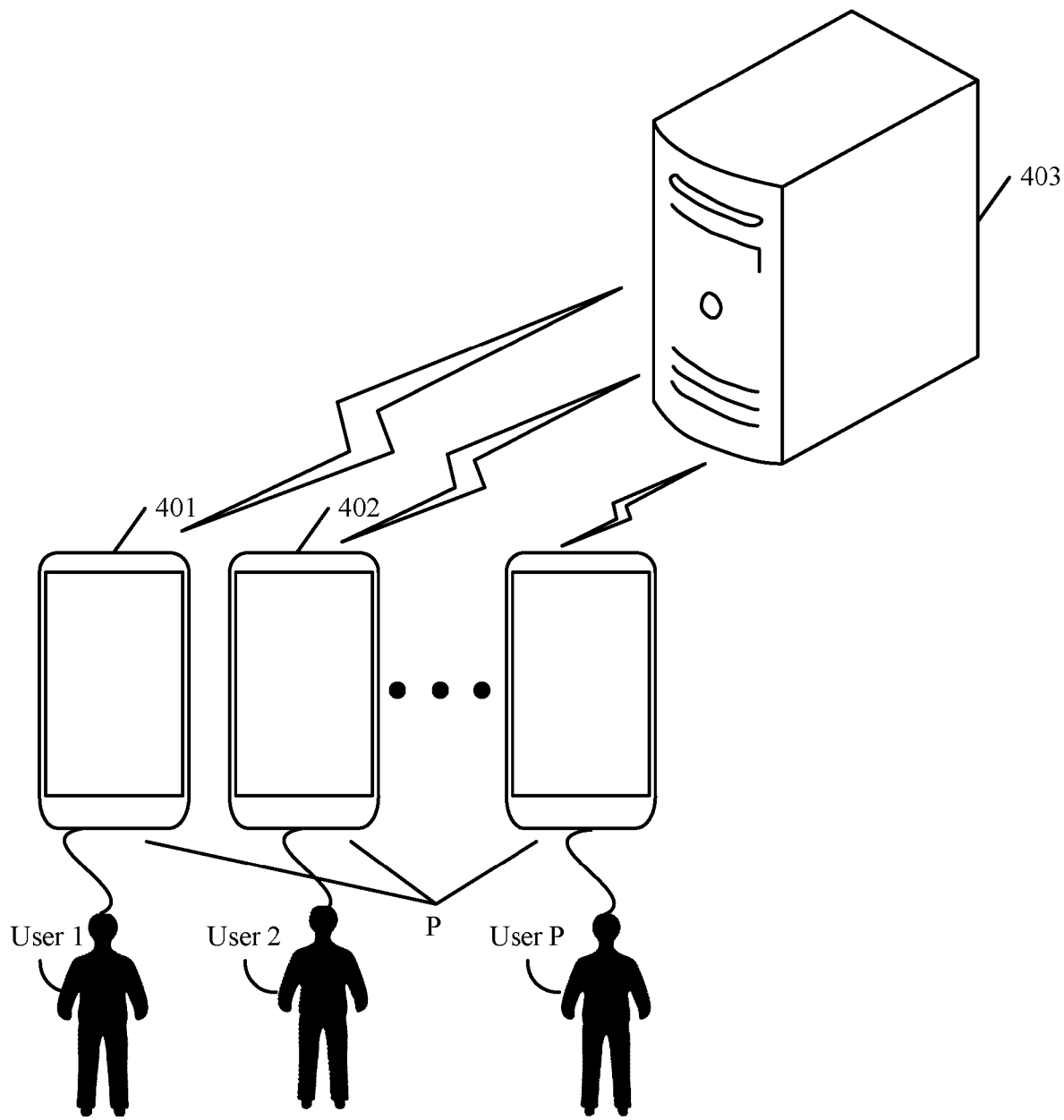
FIG. 4 is a schematic architectural diagram of a video processing system according to an embodiment of this disclosure.

FIG. 4 is a schematic architectural diagram of a video processing system according to an embodiment of this disclosure. As shown in FIG. 4, the video processing system includes P terminals (e.g., a first terminal 401, a second terminal 402, and the like) and a server 403, P being an integer greater than 1. Any of the P terminals may be a device having a camera function such as a smartphone, a tablet computer, a laptop, a desktop computer, a smart speaker, a smartwatch, and a smart wearable device, which is not limited herein. Any of the P terminals may support installation and operation of various applications, which may include, but are not limited to, social applications (e.g., instant messaging applications, audio session applications, video session applications, and the like), audio and video applications (e.g., audio and video on demand applications, audio and video players, and the like), gaming applications, and the like. The server may be an independent physical server, or may be a server cluster composed of a plurality of physical servers or a distributed system, and may further be a cloud server that provides cloud computing services. This is not limited in the embodiments of this disclosure. The P terminals and the server 403 may be directly or indirectly connected in a wired or wireless communication manner. This is not limited in this disclosure. The following describes the video processing solution provided in the embodiments of this disclosure by an example of a video session scenario.

(1) Encoders 20 are Deployed in the P Terminals, Respectively, and the P Terminals Perform Video Processing.

P users participate in a video session by using video session applications run on the P terminals. For example, a user 1 participates in the video session by using the video session application run on the first terminal 401, a user 2 participates in the video session by using the video session application run on the second terminal 402, and so on. The server 403 is configured to transmit a target video generated by the P terminals during the video session. The target video may include a session video generated by the P terminals during the video session. The first terminal 401 is any of the P terminals. A description is provided by an example in which the first terminal 401 processes the target video, and processing of the target video by the other terminals among the P terminals except the first terminal 401 are the same as the processing of the target video by the first terminal 401.

The target video is composed of a plurality of consecutive video frames, and each video frame included in the target video includes a plurality of to-be-encoded data blocks. The encoder 20 is deployed in the first terminal 401. The first terminal 401 calls the encoder 20 to perform scene complexity analysis on each data block in each video frame included in the target video, determine an encoding mode for each data block, and encode each data block according to the determined encoding mode, to finally obtain an encoded target video. The first terminal 401 may transmit the encoded target video to the server 403, and the server 403 transmits the encoded target video to the other terminals which participate in the video session; or, the first terminal 401 may directly transmit the encoded target video to the other terminals which participate in the video session; and the other terminals receive the encoded target video, and parse and play the target video, to implement the video session in which the P terminals participate.

(2) The Encoder 20 is Deployed in the Server 403, and the Server 403 Performs Video Processing.

P users participate in a video session by using video session applications run on the P terminals. For example, a user 1 participates in the video session by using the video session application run on the first terminal 401, a user 2 participates in the video session by using the video session application run on the second terminal 402, and so on. The server 403 is configured to process and transmit a target video generated by the P terminals during the video session. The target video may include a session video generated by the P terminals during the video session.

The target video may be a session video generated by the first terminal 401 in a process of participating in the video session, and the first terminal 401 transmits the target video to the server 403. The target video is composed of a plurality of consecutive video frames, and each video frame included in the target video includes a plurality of to-be-encoded data blocks. The encoder 20 is deployed in the server 403. The server 403 calls the encoder 20 to analyze a scene complexity of each data block in each video frame included in the target video, determine an encoding mode for each data block, and encode each data block according to the determined encoding mode, to finally obtain an encoded target video. The server 403 transmits the encoded target video to the other terminals which participate in the video session; and the other terminals receive the encoded target video, and parse and play the target video, to implement the video session in which the P terminals participate.

In the embodiments of this disclosure, each terminal or the server which participates in the video session may call the encoder to encode the target video generated during the video session, and the encoding mode for each data block included in the target video by each terminal or the server is determined according to the scene complexity of each data block, which can improve the encoding speed of the data block, improve the encoding speed of the target video, and accelerate the encoding speed of the target video while maintaining quality of the target video, thereby improving the smoothness of the target video, improving the session quality of the video session to an extent, optimizing the video session effect, and/or improving the user experience.

Figure 5:
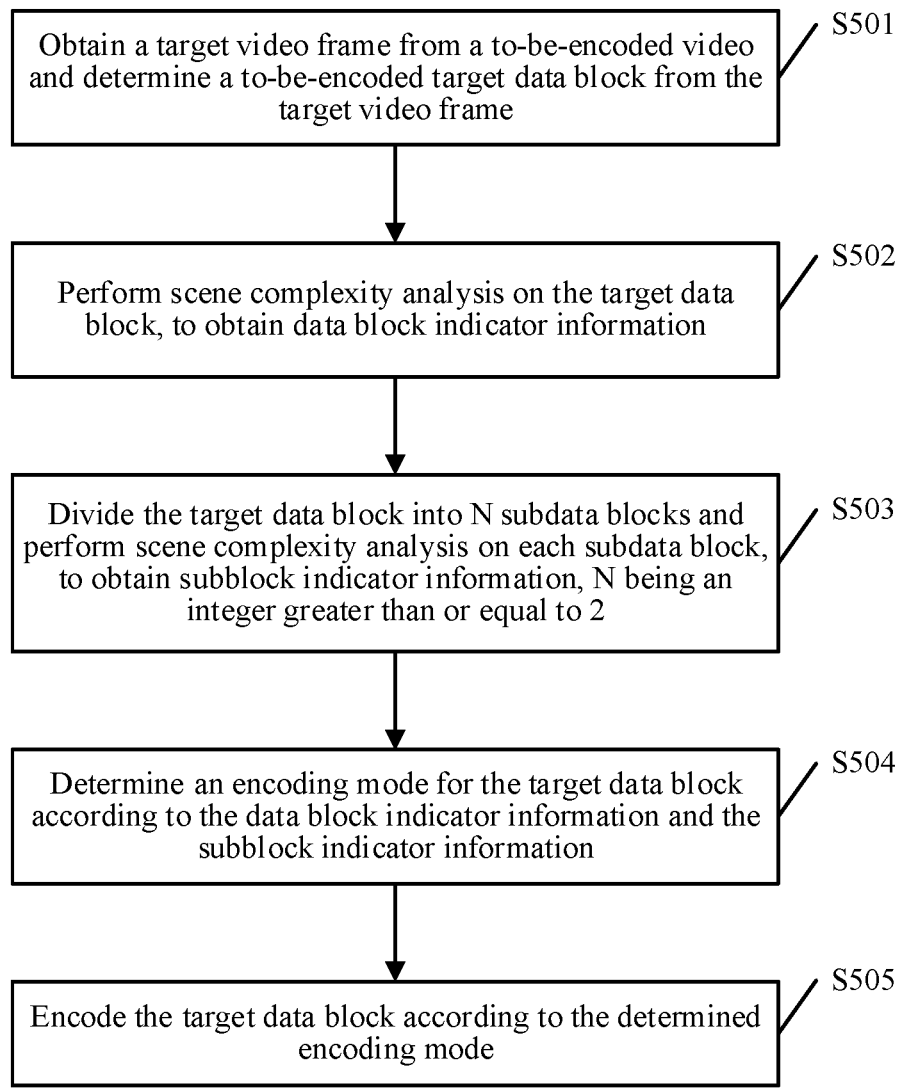
FIG. 5 is a schematic flowchart of a video processing method according to an embodiment of this disclosure.

FIG. 5 is a schematic diagram of a video processing method according to an embodiment of this disclosure. The video processing method may be performed by an apparatus, such as a smart device. The smart device may be a user terminal or a server. The user terminal may be a device having a camera function such as a smartphone, a tablet computer, or a smart wearable device. The smart device may be, for example, any terminal or a server in the video processing system shown in FIG. 4. The video processing method may include the following steps S501 to step S505.

In step S501, a target video frame may be obtained from a to-be-encoded video and a to-be-encoded target data block may be determined from the target video frame. The to-be-encoded video is composed of, or includes, a plurality of consecutive video frames, the target video frame is obtained from the to-be-encoded video, and the target video frame is any video frame in the to-be-encoded video. The target video frame includes a plurality of data blocks, there may be encoded data blocks and to-be-encoded data blocks in the plurality of data blocks, the to-be-encoded target data block is determined from the target video frame, and the target data block is any to-be-encoded data block in the target video frame.

In step S502, scene complexity analysis may be performed on the target data block, to obtain data block indicator information. In an example, data block indicator information of the target data block is determined based on a scene complexity of the target data block. The data block indicator information obtained by performing the scene complexity analysis on the target data block may include, but is not limited to, at least one of the following: a distortion estimation parameter of the target data block, a spatial information parameter of the target data block, and a temporal information parameter of the target data block. The distortion (Dist) estimation parameter may be obtained by estimating the degree of distortion during intra-frame prediction encoding or inter-frame prediction encoding. The distortion estimation parameter of the target data block may be used to measure the degree of distortion of a reconstructed target data block compared to a raw target data block. The raw target data block may refer to a target data block that is not encoded, and the reconstructed target data block may refer to an encoded target data block obtained after performing intra-frame prediction encoding or inter-frame prediction encoding on the target data block. The spatial information parameter of the target data block may refer to a value of the spatial information obtained through calculation of the target data block; and the temporal information parameter of the target data block may refer to a value of the temporal information obtained through calculation of the target data block.

In step S503, the target data block may be divided into N subdata blocks and scene complexity analysis may be performed on each subdata block, to obtain subblock indicator information, N being an integer greater than or equal to 2. In an example, the target data block is divided into a plurality of subdata blocks, and subblock indicator information of the subdata blocks are determined based on scene complexities of the subdata blocks.

The subblock indicator information may include N subblock indicator data, an $i^{th}$ subdata block is any subblock in the N subdata blocks, an $i^{th}$ subblock indicator data is any subblock indicator data in the N subblock indicator data, an $i^{th}$ subdata block corresponds to the $i^{th}$ subblock indicator data, and the $i^{th}$ subblock indicator data is obtained by performing scene complexity analysis on the $i^{th}$ subdata block, $i \in [1,N]$.

The $i^{th}$ subblock indicator data may include, but is not limited to, at least one of the following: a distortion estimation parameter of the $i^{th}$ subdata block, a spatial information parameter of the $i^{th}$ subdata block, and a temporal information parameter of the $i^{th}$ subdata block. The distortion estimation parameter of the $i^{th}$ subdata block may be used for measuring the degree of distortion of a reconstructed $i^{th}$ subdata block compared to a raw $i^{th}$ subdata block. The raw $i^{th}$ subdata block may refer to an $i^{th}$ subdata block that is not encoded, and the reconstructed $i^{th}$ subdata block may refer to an encoded $i^{th}$ subdata block after performing intra-prediction encoding or inter-prediction encoding on the $i^{th}$ subdata block. The spatial information parameter of the $i^{th}$ subdata block may refer to a value of the spatial information obtained through calculation of the $i^{th}$ subdata block; the temporal information parameter of the $i^{th}$ subdata block may refer to a value of the temporal information obtained through calculation of the $i^{th}$ subdata block.

In step S504, an encoding mode for the target data block may be determined according to the data block indicator information and the subblock indicator information.

In an embodiment, the data block indicator information and the subblock indicator information may be inputted to a joint statistical model, the joint statistical model performs calculation on the data block indicator information and the subblock indicator information, to obtain an output value obtained through calculation by the joint statistical model based on the data block indicator information and the subblock indicator information, and the encoding mode for the target data block is determined according to the output value of the joint statistical model. The joint statistical model may be obtained by training the data block indicator information of the data block of the determined encoding mode, and the subblock indicator information of the N subdata blocks obtained by dividing the data block of the determined encoding mode. In this embodiment, the joint statistical model may perform weighted calculation on the data block indicator information and the subblock indicator information, to obtain the output value. A weighting factor may be obtained by training relevant information of the data block of the determined encoding mode and subblocks thereof.

In a case that the output value of the joint statistical model meets a first condition, that is, the output value is greater than a first division threshold, it is determined that the encoding mode for the target data block is a first mode. The output value of the joint statistical model meeting the first condition indicates that a correlation between the N subdata blocks obtained by dividing the target data block is weak, and it is more inclined to divide the target data block into N subdata blocks and encode each subdata block separately. In a case that the output value of the joint statistical model meets a second condition, that is, the output value is less than a second division threshold, it is determined that the encoding mode for the target data block is a second mode. The output value of the joint statistical model meeting the second condition indicates that a correlation between the N subdata blocks obtained by dividing the target data block is strong, and it is more inclined not to divide the target data block, but directly encode the target data block. The first division threshold and the second division threshold may be obtained during training of the joint statistical model.

In step S505, the target data block may be encoded according to the determined encoding mode. In a case that the encoding mode is the first mode, encoding the target data block according to the determined encoding mode may refer to encoding the target data block according to the first mode, and further may refer to dividing the target data block into the N subdata blocks and inputting each subdata block to an encoder for encoding. In a case that the encoding mode is the second mode, the encoding of the target data block according to the determined encoding mode may refer to encoding the target data block according to the second mode, and further may refer to directly inputting the target data block to an encoder for encoding.

In this embodiment of this disclosure, a scene complexity analysis result (e.g., the data block indicator information and the subblock indicator information) of the scene complexity analysis of the target data block is inputted to the joint statistical model for calculation, and the encoding mode for the target data block is determined according to the output value obtained through calculation by the joint statistical model. The video processing solution provided in this embodiment of this disclosure is suitable for any video scene, and can adaptively adjust the encoding mode for the target data block according to a scene complexity of a to-be-encoded target data block in any video, so as to determine the encoding mode suitable for the scene complexity of the target data block, which can improve the encoding speed of the target data block, further improve the video encoding speed, and can obtain an optimal balance between the encoding speed of the video and the encoding bit rate of the video.

Figure 6:
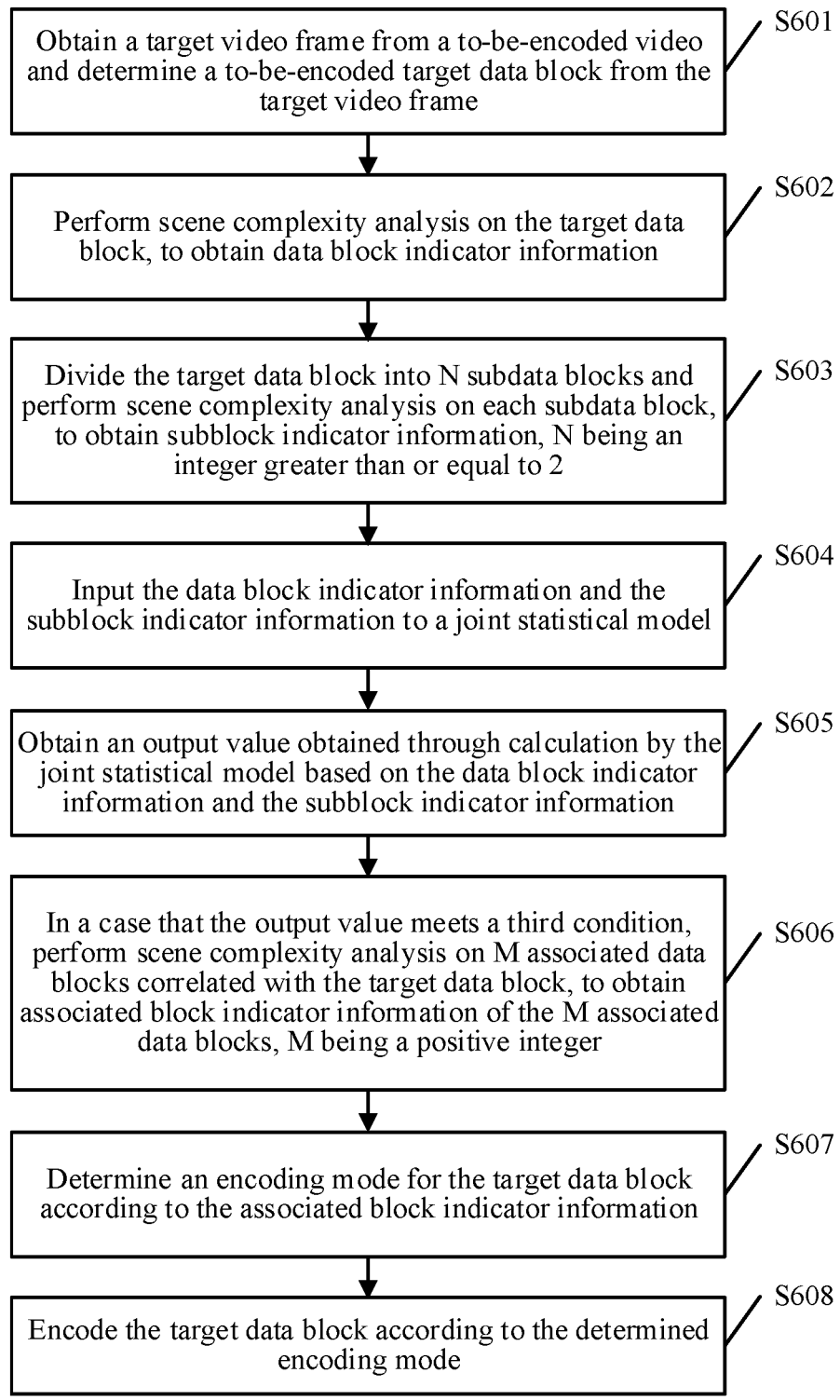
FIG. 6 is a schematic flowchart of another video processing method according to an embodiment of this disclosure.

FIG. 6 is a schematic diagram of another video processing method according to an embodiment of this disclosure. The video processing method may be performed by an apparatus, such as a smart device. The smart device may be a user terminal or a server. The user terminal may be a device having a camera function such as a smartphone, a tablet computer, or a smart wearable device. The smart device may be, for example, any terminal or a server in the video processing system shown in FIG. 4. The video processing method may include the following steps S601 to step S608.

In step S601, a target video frame may be obtained from a to-be-encoded video and a to-be-encoded target data block may be determined from the target video frame.

In step S602, scene complexity analysis may be performed on the target data block, to obtain data block indicator information.

In step S603, the target data block may be divided into N subdata blocks and scene complexity analysis may be performed on each subdata block, to obtain subblock indicator information, N being an integer greater than or equal to 2.

A process of step S601 in this embodiment of this disclosure may be the same as a process of step S501 in the embodiments shown in FIG. 5, a process of step S602 may be the same as a process of step S502 in the embodiments shown in FIG. 5, a process of step S603 may be the same as a process of step S503 in the embodiments shown in FIG. 5, and examples of the specific processes may be referred to the description of the embodiments shown in FIG. 5, which are not repeated herein.

In step S604, the data block indicator information and the subblock indicator information may be input to a joint statistical model.

In step S605, an output value obtained through calculation by the joint statistical model may be obtained based on the data block indicator information and the subblock indicator information.

In step S606, in a case that the output value meets a third condition, scene complexity analysis may be performed on M associated data blocks correlated with the target data block, to obtain associated block indicator information of the M associated data blocks, M being a positive integer.

In step S607, an encoding mode for the target data block may be determined according to the associated block indicator information.

In steps S606 to S607, in a case that the output value of the joint statistical model meets the third condition, that is, the output value is less than or equal to a first division threshold, and the output value is greater than or equal to a second division threshold, it indicates that a correlation between the N subdata blocks obtained by dividing the target data block is between strong and weak, there is no significant tendency to divide the target data block into the N subdata blocks and then encode each subdata block separately, nor is there a significant tendency to encode the target data block directly instead of dividing the target data block. In this case, the M associated data blocks correlated with the target data block are determined, the scene complexity analysis is performed on the M associated data blocks, to obtain the associated block indicator information of the M associated data blocks, and the encoding mode for the target data block is determined according to the associated block indicator information of the M associated data blocks, M being a positive integer. The associated block indicator information of the M associated data blocks may include a first quantity of associated data blocks, among the M associated data blocks, that are divided into a plurality of subdata blocks for encoding.

In an embodiment, in a case that the first quantity meets a fourth condition, that is, the first quantity is greater than or equal to the first quantity threshold, it indicates that the scene complexity of the M associated data blocks correlated with the target data block is high, first the target data block is attempted to be divided into N to-be-analyzed subdata blocks (e.g., the N subdata blocks), and the scene complexity analysis is performed on the N to-be-analyzed subdata blocks, to obtain to-be-analyzed subdata block indicator information; and the encoding mode for the target data block is further determined according to the to-be-analyzed subdata block indicator information. The first quantity threshold may be set according to an empirical value, for example, the quantity of associated data blocks correlated with the target data block is 3, and the first quantity threshold may be set to 2. For example, in FIG. 3, the three associated data blocks correlated with the target data block 301 are the associated data block 302, the associated data block 303, and the associated data block 304, the associated data block 302 and the associated data block 303 are divided into a plurality of subdata blocks for encoding, and the associated data block 304 is not divided but is directly encoded, that is, the first quantity of associated data blocks, among the three associated data blocks, that are divided into a plurality of subdata blocks for encoding is 2. In a case that the first quantity meets the fourth condition, it can be determined that the scene complexity of the three associated data blocks correlated with the target data block 301 is high, and first the target data block 301 is attempted to be divided into N to-be-analyzed subdata blocks. The to-be-analyzed subdata block indicator information may include a second quantity of to-be-analyzed subdata blocks, among the N to-be-analyzed subdata blocks, that meets a further division condition. Further, the to-be-analyzed subdata block indicator information may refer to a second quantity of output values, among the N output values obtained through calculation based on the data block indicator information of each to-be-analyzed subdata block in the N to-be-analyzed subdata blocks and the subblock indication information of the N subdata blocks obtained by dividing each to-be-analyzed data block by the joint statistical model, that meets a first condition.

In an embodiment, in a case that the second quantity meets the fifth condition, that is, the second quantity is greater than or equal to the second quantity threshold, it may be determined that the encoding mode for the target data block is the first mode. In a case that the second quantity does not meet the fifth condition, that is, the second quantity is less than the second quantity threshold, the target data block is attempted to be encoded directly and then according to the encoding information of the target data block obtained by directly encoding the target data block, and according to the encoding information of N subdata blocks obtained by dividing the target data block into the N subdata blocks and encoding each subdata block separately, the encoding mode for the target data block is determined. The second quantity threshold may alternatively be set according to an empirical value. For example, in a case that the target data block is divided into four to-be-analyzed subdata blocks, the second quantity threshold may be set to 3. In a case that all the four to-be-analyzed subdata blocks meet the further division condition, that is, the second quantity of to-be-analyzed subdata blocks, among the four to-be-analyzed subdata blocks, that meets the further division condition is 4, and the second quantity meets the fifth condition, it can be determined that the encoding mode for the target data block is the first mode.

In an embodiment, in a case that the first quantity does not meet the fourth condition, that is, the first quantity is less than the first quantity threshold, it indicates that the scene complexity of the M associated data blocks correlated with the target data block is low, first the data block is not attempted to be divided and the target data block is directly encoded, the encoding information of the target data block obtained by encoding the target data block is obtained, and the encoding information of the target data block may include an encoding distortion parameter of the target data block. The distortion estimation parameter of the target data block may refer to an estimated value of the degree of distortion in the encoding process of the target data block, and the encoding distortion parameter of the target data block may be used for measuring an actual degree of distortion of the encoded target data block (e.g., the reconstructed target data block) compared to the target data block before encoding (e.g., the raw target data block). Further, an encoding parameter is obtained through calculation based on the encoding distortion parameter of the target data block and a quantization parameter (QP) for quantifying the target data block, and the calculation process of the encoding parameter can be referred to the following Formula 1:

$$\text{Code} = \text{Dist}/QP2 \quad \quad \text{Formula 1}$$

In the Formula 1, Code represents the encoding parameter, Dist represents the encoding distortion parameter of the target data block, and QP represents the quantization parameter.

In an embodiment, in a case that the encoding parameter meets a sixth condition, that is, the encoding parameter is less than a third division threshold, it may be determined that the encoding mode for the target data block is the second mode. In another embodiment, in a case that the encoding parameter does not meet the sixth condition, that is, the encoding parameter is greater than or equal to the third division threshold, the target data block is attempted to be divided into N subdata blocks, each subdata block is encoded separately, and according to the encoding information of the target data block obtained by directly encoding the target data block, and according to the encoding information of the N subdata blocks obtained by dividing the target data block into the N subdata blocks and encoding each subdata block separately, the encoding mode for the target data block is determined. The third division threshold may be obtained during training of the joint statistical model.

In the foregoing two embodiments, the encoding information of the target data block may also include a first encoding rate distortion loss parameter of the target data block; and the encoding information of the N subdata blocks may include a second encoding rate distortion loss parameter of the N subdata blocks. The second encoding rate distortion loss parameter is obtained through calculation based on a third encoding rate distortion loss parameter of each of the N subdata blocks, for example, the second encoding rate distortion loss parameter may be the sum of third encoding rate distortion loss parameters of all the N subdata blocks. The first encoding rate distortion loss parameter is obtained through calculation based on an encoding bit rate and an encoding distortion parameter of the encoding mode for directly encoding the target data block. For example, the first encoding rate distortion loss parameter may be a ratio of the encoding bit rate to the encoding distortion parameter. The first encoding rate distortion loss parameter may be used for measuring the encoding effect of directly encoding the target data block, and a smaller first encoding rate distortion loss parameter indicates a better encoding effect of the target data block. The good encoding effect of the target data block may refer to that the encoding bit rate of the target data block is relatively low in a case that the degree of distortion of the encoded target data block is lower than that of the target data block before encoding. Similarly, the second encoding rate distortion loss parameter may be used for measuring the encoding effect of dividing the target data block into N subdata blocks and encoding each subdata block separately. A smaller second encoding rate distortion loss parameter indicates a better effect of encoding the target data block. In a case that the first encoding rate distortion loss parameter is greater than or equal to the second encoding rate distortion loss parameter, it is determined that the encoding mode for the target data block is the first mode; and in a case that the first encoding rate distortion loss parameter is less than the second encoding rate distortion loss parameter, it is determined that the encoding mode for the target data block is the second mode.

In step S608, the target data block may be encoded according to the determined encoding mode.

A process of step S608 in this embodiment of this disclosure may be the same as a process of step S505 in this embodiment shown in FIG. 5, and an example of a specific process may be referred to in the description of the embodiments shown in FIG. 5, which are not repeated herein.

In the embodiments of this disclosure, the scene complexity of the associated data block correlated with the target data block may also reflect the scene complexity of the target data block to an extent, and therefore, in the embodiments of this disclosure, the encoding mode for the target data block is jointly determined according to the scene complexity of the target data block (e.g., the output value of the joint statistical model) and the scene complexity of the associated data block correlated with the target data block (e.g., the associated block indication information). The video processing solution provided in this embodiment of this disclosure has universality, and can adaptively adjust the encoding mode for the target data block according to a scene complexity of a to-be-encoded target data block in any video, so as to determine the encoding mode suitable for the scene complexity of the target data block, which can improve the encoding speed of the target data block, further improve the video encoding speed, and can effectively improve the video encoding speed without losing the video encoding efficiency and a more optimal balance between the video encoding speed and the video encoding bit rate.

Figure 7:
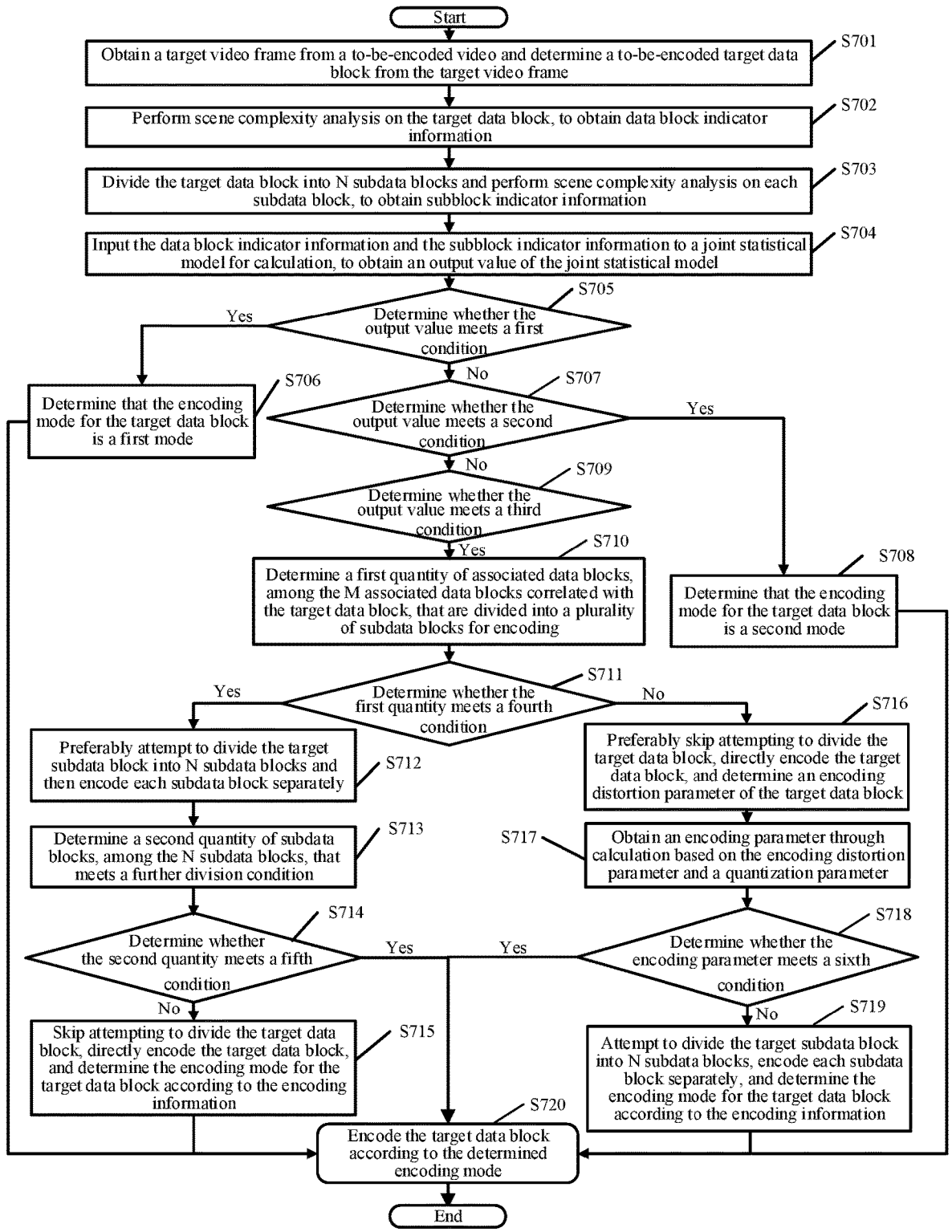
FIG. 7 is a schematic flowchart of another video processing method according to an embodiment of this disclosure.

FIG. 7 is a schematic diagram of another video processing method according to an embodiment of this disclosure. The video processing method may be performed by an apparatus, such as a smart device. The smart device may be a user terminal or a server. The user terminal may be a device having a camera function such as a smartphone, a tablet computer, or a smart wearable device. The smart device may be, for example, any terminal or a server in the video processing system shown in FIG. 4. The video processing method may include the following steps S701 to step S720.

In step S701, a target video frame may be obtained from a to-be-encoded video and a to-be-encoded target data block may be determined from the target video frame.

In step S702, scene complexity analysis may be performed on the target data block, to obtain data block indicator information.

In step S703, the target data block may be divided into N subdata blocks and scene complexity analysis may be performed on each subdata block, to obtain subblock indicator information.

In step S704, the data block indicator information and the subblock indicator information are input to a joint statistical model for calculation, to obtain an output value of the joint statistical model.

In step S705, whether the output value meets a first condition is determined. In a case that the output value meets the first condition, step S706 is performed; and in a case that the output value does not meet the first condition, step S707 is performed.

In step S706, in a case that the output value meets the first condition, it may be determined that the encoding mode for the target data block is a first mode. After step S706 is completed, step S720 is performed.

In step S707, in a case that the output value does not meet the first condition, it may be determined whether the output value meets a second condition. In a case that the output value meets the second condition, step S708 is performed; and in a case that the output value does not meet the second condition, step S709 is performed.

In step S708, in a case that the output value meets the second condition, it may be determined that the encoding mode for the target data block is a second mode. After step S708 is completed, step S720 is performed.

In step S709, in a case that the output value does not meet the second condition, whether the output value meets a third condition may be determined. In a case that the output value meets the third condition, step S710 is performed.

In step IS710, in a case that the output value meets the third condition, a first quantity of associated data blocks, among the M associated data blocks correlated with the target data block, that are divided into a plurality of subdata blocks for encoding may be determined.

In step S711, whether the first quantity meets a fourth condition may be determined. In a case that the first quantity meets the fourth condition, step S712 is performed; and in a case that the first quantity does not meet the fourth condition, step S716 is performed.

In step S712, in a case that the first quantity meets the fourth condition, dividing of the target subdata block into N subdata blocks may be attempted and then each subdata block may be separately encoded.

In step S713, a second quantity of subdata blocks, among the N subdata blocks, that meets a further division condition may be determined.

In step S714, whether the second quantity meets a fifth condition may be determined. In a case that the second quantity meets the fifth condition, it is determined that the encoding mode for the target data block is the first mode, and step S720 is performed. In a case that the second quantity does not meet the fifth condition, step S715 is performed.

In step S715, attempting to divide the target data block may be skipped, the target data block may be directly encoded, and the encoding mode for the target data block may be determined according to the encoding information. Further, the encoding information of the target data block obtained by directly encoding the target data block is obtained, the encoding information of N subdata blocks obtained by dividing the target data block into the N subdata blocks and encoding each subdata block separately is obtained, and the encoding mode for the target data block is determined according to the encoding information of the target data block and the encoding information of the N subdata blocks. A specific process may be referred to the embodiments shown in FIG. 6. After step S715 is completed, step S720 is performed.

In step S716, in a case that the first quantity does not meet the fourth condition, attempting to divide the target data block may be skipped, the target data block may be directly encoded, and an encoding distortion parameter of the target data block may be determined.

In step S717, an encoding parameter may be obtained through calculation based on the encoding distortion parameter and a quantization parameter.

In step S718, whether the encoding parameter meets a sixth condition may be determined. In a case that the encoding parameter meets the sixth condition, it is determined that the encoding mode for the target data block is the second mode, and step S720 is performed; and in a case that the encoding parameter does not meet the sixth condition, step S719 is performed.

In step S719, an attempt to divide the target subdata block into N subdata blocks may be performed, each subdata block may be separately encoded, and the encoding mode for the target data block may be determined according to the encoding information. Further, the encoding information of the target data block obtained by directly encoding the target data block is obtained, the encoding information of N subdata blocks obtained by dividing the target data block into the N subdata blocks and encoding each subdata block separately is obtained, and the encoding mode for the target data block is determined according to the encoding information of the target data block and the encoding information of the N subdata blocks. An exemplary process may be referred to the embodiments shown in FIG. 6. After step S719 is completed, step S720 is performed.

In step S720, the target data block may be encoded according to the determined encoding mode. After the target data block is encoded according to the determined encoding mode, another to-be-encoded data block other than the target data block may be determined from the to-be-encoded video frame, the encoding mode for the to-be-encoded data block may be determined according to the scene complexity of the to-be-encoded data block, and the to-be-encoded data block may be encoded according to the determined encoding mode. The process for determining the encoding mode for the to-be-encoded data block according to the scene complexity of the to-be-encoded data block may be the same as the process for determining the encoding mode for the target data block according to the scene complexity of the target data block.

In the embodiments of this disclosure, the scene complexity of the associated data block correlated with the target data block may also reflect the scene complexity of the target data block to an extent, and therefore, in the embodiments of this disclosure, the encoding mode for the target data block may be jointly determined according to the scene complexity of the target data block (e.g., the output value of the joint statistical model) and the scene complexity of the associated data block correlated with the target data block (e.g., the associated block indication information). In the embodiments of this disclosure, six determining conditions are set for performing a multi-perspective comprehensive analysis on the scene complexity of the target data block, so that the finally determined encoding mode for the target data block has a high degree of adaptation with the scene complexity of the target data block, which can improve the encoding speed of the target data block, further improve the video encoding speed, and can improve the video encoding speed without losing the video encoding quality and video encoding efficiency while ensuring the definition and smoothness of the encoded video.

Figure 8:
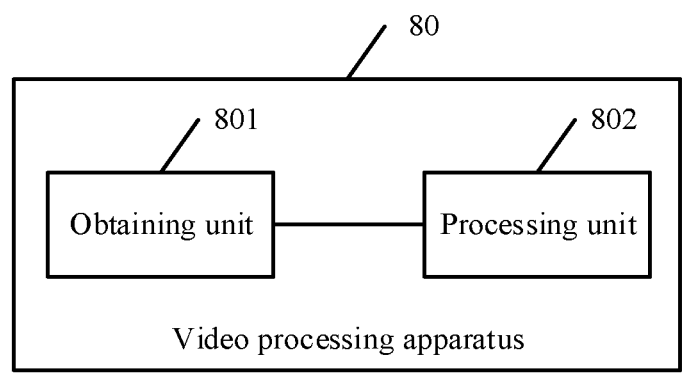
FIG. 8 is a schematic structural diagram of a video processing apparatus according to an embodiment of this disclosure.

FIG. 8 is a schematic structural diagram of a video processing apparatus according to an embodiment of this disclosure. A video processing apparatus 80 according to this embodiment of this disclosure may be disposed in an apparatus, such as a smart device. The smart device may be a smart terminal or a server. The video processing apparatus 80 may be configured to perform the corresponding steps in the video processing method shown in FIG. 5, FIG. 6, or FIG. 7, and the video processing apparatus 80 may include an obtaining unit 801 and a processing unit 802. One or more modules, submodules, and/or units of the apparatus can be implemented by processing circuitry, software, or a combination thereof, for example.

The obtaining unit 801 may be configured to obtain a target video frame from a to-be-encoded video and determine a to-be-encoded target data block from the target video frame.

The processing unit 802 may be configured to perform scene complexity analysis on the target data block, to obtain data block indicator information; divide the target data block into N subdata blocks and perform scene complexity analysis on each subdata block, to obtain subblock indicator information, N being an integer greater than or equal to 2; determine an encoding mode for the target data block according to the data block indicator information and the subblock indicator information; and encode the target data block according to the determined encoding mode.

In an embodiment, the data block indicator information includes any one or more of: a distortion estimation parameter of the target data block, a spatial information parameter of the target data block, and a temporal information parameter of the target data block.

The subblock indicator information includes N subblock indicator data, where an $i^{th}$ subblock indicator data in the N subblock indicator data includes any one or more of: a distortion estimation parameter of an $i^{th}$ subdata block in the N subdata blocks, a spatial information parameter of the $i^{th}$ subdata block, and a temporal information parameter of the $i^{th}$ subdata block, $i \in [1, N]$.

In an embodiment, the processing unit 802 may be further configured to input the data block indicator information and the subblock indicator information to a joint statistical model; obtain an output value obtained through calculation by the joint statistical model based on the data block indicator information and the subblock indicator information; and determine the encoding mode for the target data block according to the output value.

In an embodiment, the processing unit 802 may be further configured to, in a case that the output value meets a first condition, determine that the encoding mode is a first mode; and divide the target data block into the N subdata blocks and input each subdata block to an encoder for encoding. In an example, the output value meeting the first condition can refers to the output value being greater than a first division threshold.

In an embodiment, the processing unit 802 may be further configured to, in a case that the output value meets a second condition, determine that the encoding mode is a second mode; and input the target data block to an encoder for encoding. The output value meeting the second condition may refer to the output value is less than a second division threshold.

In an embodiment, the processing unit 802 may be further configured to, in a case that the output value meets a third condition, perform scene complexity analysis on M associated data blocks correlated with the target data block, to obtain associated block indicator information of the M associated data blocks, M being a positive integer; and determine the encoding mode for the target data block according to the associated block indicator information. The output value meeting the third condition may refer to: the output value is less than or equal to a first division threshold and the output value is greater than or equal to a second division threshold.

In an embodiment, the processing unit 802 may be further configured to obtain the associated block indicator information, the associated block indicator information including: a first quantity of associated data blocks, among the M associated data blocks, that are divided into a plurality of subdata blocks for encoding; in a case that the first quantity meets a fourth condition, divide the target data block into N to-be-analyzed subdata blocks; perform scene complexity analysis on the N to-be-analyzed subdata blocks, to determine to-be-analyzed subdata block indicator information of the N to-be-analyzed subdata blocks; and determine the encoding mode for the target data block according to the to-be-analyzed subdata block indicator information. The first quantity meeting the fourth condition may refer to the first quantity is greater than or equal to a first quantity threshold.

In an embodiment, the processing unit 802 is further configured to obtain the to-be-analyzed subdata block indicator information, the to-be-analyzed subdata block indicator information including: a second quantity of to-be-analyzed subdata blocks, among the N to-be-analyzed subdata blocks, that meets a further division condition; in a case that the second quantity meets a fifth condition, determine that the encoding mode is a first mode; and in a case that the second quantity does not meet the fifth condition, input the target data block to an encoder for encoding and determine the encoding mode for the target data block according to encoding information of the target data block obtained through encoding. The second quantity meeting the fifth condition may refer to the second quantity is greater than or equal to a second quantity threshold; and the second quantity not meeting the fifth condition may refer to the second quantity is less than the second quantity threshold.

In an embodiment, the processing unit 802 is further configured to, in a case that the first quantity does not meet the fourth condition, input the target data block to an encoder for encoding; and determine the encoding mode for the target data block according to encoding information of the target data block obtained through encoding. The first quantity not meeting the fourth condition may refer to the first quantity is less than the first quantity threshold.

In an embodiment, the encoding information of the target data block includes an encoding distortion parameter of the target data block; and the processing unit 802 is further configured to obtain an encoding parameter through calculation based on the encoding distortion parameter of the target data block and a quantization parameter of the target data block; in a case that the encoding parameter meets a sixth condition, determine that the encoding mode is a second mode; in a case that the encoding parameter does not meet the sixth condition, divide the target data block into the N subdata blocks and input each of the N subdata blocks to the encoder for encoding; and determine the encoding mode for the target data block according to the encoding information of the target data block and encoding information of the N subdata blocks obtained through encoding. The encoding parameter meeting the sixth condition may refer to the encoding parameter is less than a third division threshold; and the encoding parameter not meeting the sixth condition may refer to the encoding parameter is greater than or equal to the third division threshold.

In an embodiment, the encoding information of the target data block also includes a first encoding rate distortion loss parameter of the target data block; and the encoding information of the N subdata blocks includes a second encoding rate distortion loss parameter of the N subdata blocks, the second encoding rate distortion loss parameter being obtained through calculation based on a third encoding rate distortion loss parameter of each of the N subdata blocks; and the processing unit 802 is further configured to in a case that the first encoding rate distortion loss parameter is greater than or equal to the second encoding rate distortion loss parameter, determine that the encoding mode for the target data block is the first mode; and in a case that the first encoding rate distortion loss parameter is less than the second encoding rate distortion loss parameter, determine that the encoding mode for the target data block is the second mode.

The term module (and other similar terms such as unit, submodule, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

In an embodiment of this disclosure, the units in the video processing apparatus 80 shown in FIG. 8 may be separately or wholly combined into one or several other units, or one (or more) of the units herein may further be divided into multiple units of smaller functions. In this way, same operations can be implemented, and implementation of the technical effects of the embodiments of this disclosure is not affected. The foregoing units are divided based on logical functions. In an actual application, a function of one unit may also be implemented by a plurality of units, or functions of a plurality of units are implemented by one unit. In other embodiments of this disclosure, the video processing apparatus 80 may also include other units. During an actual application, the functions may also be cooperatively implemented by other units and may be cooperatively implemented by a plurality of units. According to another embodiment of this disclosure, a computer program (including program code) that can perform the steps in the corresponding methods shown in FIG. 5, FIG. 6, or FIG. 7 may be run on a general computing device, such as a general-purpose computer, which includes processing elements and storage elements such as a central processing unit (CPU), a random access memory (RAM), and a read-only memory (ROM), to construct the video processing apparatus 80 shown in FIG. 8, and implement the video processing method in the embodiments of this disclosure. The computer program may be recorded on, for example, a computer-readable storage medium, and loaded in any terminal (e.g., the first terminal 401 or the second terminal 402, and the like) or the server 403 of the video processing system shown in FIG. 4 through the computer-readable storage medium, and run therein.

In the embodiments of this disclosure, by performing the scene complexity analysis on the to-be-encoded target data block in the target video frame, to obtain an analysis result of the entire to-be-encoded target data block and an analysis result after dividing the to-be-encoded target data block into a plurality of subdata blocks, and selecting the encoding mode based on these analysis results, an appropriate encoding mode can be determined relatively accurately for the to-be-encoded target data block, which can effectively improve the encoding speed of the target data block and improve the video encoding efficiency.

Figure 9:
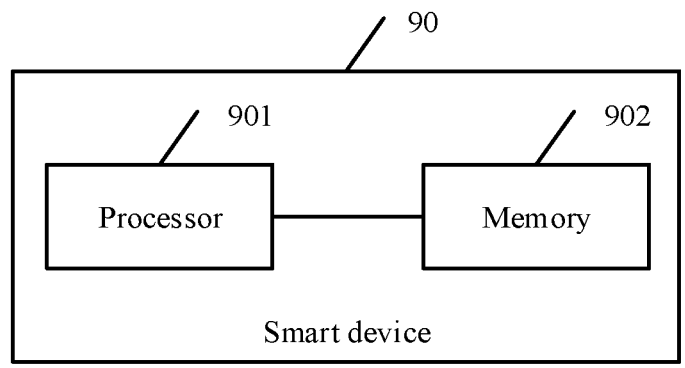
FIG. 9 is a schematic structural diagram of a smart device according to an embodiment of this disclosure.

Referring to FIG. 9, FIG. 9 is a schematic structural diagram of an apparatus, such as a smart device according to an embodiment of this disclosure. The smart device at least includes a processor 901 and a memory 902. The processor 901 and the memory 902 may be connected by a bus or in another manner.

Processing circuitry, such as the processor 901, may be a central processing unit (Central Processing Unit, CPU). The processor 901 may further include a hardware chip. The foregoing hardware chip may be an application-specific integrated circuit (ASIC), a programmable logic device (PLD), or the like. The PLD may be a field-programmable gate array (FPGA), a generic array logic (GAL), or the like.

The memory 902 may include a volatile memory such as a random access memory (RAM); the memory 902 may also include a non-volatile memory such as a flash memory or a solid-state drive (SSD); and the memory 902 may alternatively include a combination of the foregoing types of memories.

The memory 902 is configured to store a computer program. The computer program includes program instructions. The processor 901 is configured to execute the program instructions. The processor 901 (or referred to as a central processing unit, CPU) is a computing core and control core of the smart device 90, which is adapted to implement one or more computer instructions, and specifically, adapted to load and execute one or more computer instructions to implement corresponding method processes or corresponding functions.

The smart device 90 may be any terminal (e.g., the first terminal 401 or the second terminal 402, and the like) or the server 403 in the video processing system shown in FIG. 4. The memory 902 stores a computer program, which includes one or more computer instructions. One or more computer instructions are loaded and executed by the processor 901, to implement the corresponding steps in the method embodiments shown in FIG. 5, FIG. 6 or FIG. 7. In a specific implementation, the computer instructions in the memory 902 are loaded by the processor 901 to perform the following steps:

obtaining a target video frame from a to-be-encoded video and determining a to-be-encoded target data block from the target video frame;

performing scene complexity analysis on the target data block, to obtain data block indicator information;

dividing the target data block into N subdata blocks and performing scene complexity analysis on each subdata block, to obtain subblock indicator information, N being an integer greater than or equal to 2;

determining an encoding mode for the target data block according to the data block indicator information and the subblock indicator information; and encoding the target data block according to the determined encoding mode.

In an embodiment, the data block indicator information includes any one or more of: a distortion estimation parameter of the target data block, a spatial information parameter of the target data block, and a temporal information parameter of the target data block.

The subblock indicator information includes N subblock indicator data, where an $i^{th}$ subblock indicator data in the N subblock indicator data includes any one or more of: a distortion estimation parameter of an $i^{th}$ subdata block in the N subdata blocks, a spatial information parameter of the $i^{th}$ subdata block, and a temporal information parameter of the $i^{th}$ subdata block, $i \in [1,N]$.

In an embodiment, the computer instructions in the memory 902 are loaded by the processor 901 to perform the following steps:

inputting the data block indicator information and the subblock indicator information to a joint statistical model;

obtaining an output value obtained through calculation by the joint statistical model based on the data block indicator information and the subblock indicator information; and determining the encoding mode for the target data block according to the output value.

In an embodiment, the computer instructions in the memory 902 are loaded by the processor 901 to perform the following steps:

in a case that the output value meets a first condition, determining that the encoding mode is a first mode; and dividing the target data block into the N subdata blocks and inputting each subdata block to an encoder for encoding, where the output value meeting the first condition refers to: the output value is greater than a first division threshold.

In an embodiment, the computer instructions in the memory 902 are loaded by the processor 901 to perform the following steps:

in a case that the output value meets a second condition, determining that the encoding mode is a second mode; and inputting the target data block to an encoder for encoding, where the output value meeting the second condition refers to: the output value is less than a second division threshold.

In an embodiment, the computer instructions in the memory 902 are loaded by the processor 901 to perform the following steps:

in a case that the output value meets a third condition, performing scene complexity analysis on M associated data blocks correlated with the target data block, to obtain associated block indicator information of the M associated data blocks, M being a positive integer;

determining the encoding mode for the target data block according to the associated block indicator information, where the output value meeting the third condition refers to: the output value is less than or equal to a first division threshold and the output value is greater than or equal to a second division threshold.

In an embodiment, the computer instructions in the memory 902 are loaded by the processor 901 to perform the following steps:

obtaining the associated block indicator information, the associated block indicator information including: a first quantity of associated data blocks, among the M associated data blocks, that are divided into a plurality of subdata blocks for encoding;

in a case that the first quantity meets a fourth condition, dividing the target data block into N to-be-analyzed subdata blocks;

performing scene complexity analysis on the N to-be-analyzed subdata blocks, to determine to-be-analyzed subdata block indicator information of the N to-be-analyzed subdata blocks; and determining the encoding mode for the target data block according to the to-be-analyzed subdata block indicator information, where the first quantity meeting the fourth condition refers to: the first quantity is greater than or equal to a first quantity threshold.

In an embodiment, the computer instructions in the memory 902 are loaded by the processor 901 to perform the following steps:

obtaining the to-be-analyzed subdata block indicator information, the to-be-analyzed subdata block indicator information including: a second quantity of to-be-analyzed subdata blocks, among the N to-be-analyzed subdata blocks, that meets a further division condition;

in a case that the second quantity meets a fifth condition, determining that the encoding mode is a first mode; and in a case that the second quantity does not meet the fifth condition, inputting the target data block to an encoder for encoding and determining the encoding mode for the target data block according to encoding information of the target data block obtained through encoding, where the second quantity meeting the fifth condition refers to: the second quantity is greater than or equal to a second quantity threshold; and the second quantity not meeting the fifth condition refers to: the second quantity is less than the second quantity threshold.

In an embodiment, the computer instructions in the memory 902 are loaded by the processor 901 to perform the following steps:

in a case that the first quantity does not meet the fourth condition, inputting the target data block to an encoder for encoding; and determining the encoding mode for the target data block according to encoding information of the target data block obtained through encoding, where the first quantity not meeting the fourth condition refers to: the first quantity is less than the first quantity threshold.

In an embodiment, the encoding information of the target data block includes an encoding distortion parameter of the target data block; and in a case that computer instructions in the memory 902 are loaded by the processor 901, the following steps are performed:

obtaining an encoding parameter through calculation based on the encoding distortion parameter of the target data block and a quantization parameter of the target data block;

in a case that the encoding parameter meets a sixth condition, determining that the encoding mode is a second mode;

in a case that the encoding parameter does not meet the sixth condition, dividing the target data block into the N subdata blocks and inputting each of the N subdata blocks to the encoder for encoding; and determining the encoding mode for the target data block according to the encoding information of the target data block and encoding information of the N subdata blocks obtained through encoding, where the encoding parameter meeting the sixth condition refers to: the encoding parameter is less than a third division threshold; and the encoding parameter not meeting the sixth condition refers to: the encoding parameter is greater than or equal to the third division threshold.

In an embodiment, the encoding information of the target data block also includes a first encoding rate distortion loss parameter of the target data block; and the encoding information of the N subdata blocks includes a second encoding rate distortion loss parameter of the N subdata blocks, the second encoding rate distortion loss parameter being obtained through calculation based on a third encoding rate distortion loss parameter of each of the N subdata blocks; and in a case that computer instructions in the memory 902 are loaded by the processor 901, the following steps are performed:

in a case that the first encoding rate distortion loss parameter is greater than or equal to the second encoding rate distortion loss parameter, determining that the encoding mode for the target data block is the first mode; and in a case that the first encoding rate distortion loss parameter is less than the second encoding rate distortion loss parameter, determining that the encoding mode for the target data block is the second mode.

In the embodiments of this disclosure, by performing the scene complexity analysis on the to-be-encoded target data block in the target video frame, to obtain an analysis result of the entire to-be-encoded target data block and an analysis result after dividing the to-be-encoded target data block into a plurality of subdata blocks, and selecting the encoding mode based on these analysis results, an appropriate encoding mode can be determined relatively accurately for the to-be-encoded target data block, which can improve the encoding speed of the target data block and improve the video encoding efficiency.

According to an aspect of this disclosure, a computer program product or a computer program is provided, the computer program product or the computer program including computer instructions, the computer instructions being stored in a computer-readable storage medium. A processor of a computer device reads the computer instructions from the computer-readable storage medium, and executes the computer instructions, so that the computer device performs the video processing method provided in the various exemplary implementations.

A person of ordinary skill in the art may understand that all or some of the steps of the methods in the foregoing embodiments may be implemented by a program instructing relevant hardware. The program may be stored in a computer-readable storage medium, such as a non-transitory computer-readable storage medium. The computer-readable storage medium may include: a flash disk, a read-only memory (ROM), a random access memory (RAM), a magnetic disk, or an optical disc.

The contents disclosed above are merely exemplary embodiments of this disclosure, but not intended to limit the scope of this disclosure. A person of ordinary skill in the art can understand all or a part of the procedures for implementing the foregoing embodiments, and any equivalent variation made according to the claims of this disclosure shall still fall within the scope of this disclosure.

What is claimed is:

1. A video processing method, comprising:
obtaining a target video frame from a video;
determining a target data block from the target video frame;
determining data block indicator information of the target data block based on a scene complexity of the target data block;

dividing the target data block into a plurality of subdata blocks;
determining subblock indicator information of the subdata blocks based on scene complexities of the subdata blocks;
determining an encoding mode for the target data block as (i) a first mode when an output value is greater than a first division threshold, or (ii) a second mode when the output value is less than a second division threshold, the output value being calculated by inputting the data block indicator information and the subblock indicator information into a joint statistical model; and
encoding the target data block according to the determined encoding mode.

2. The method according to claim 1, wherein
the data block indicator information of the target data block includes at least one of a distortion estimation parameter of the target data block, a spatial information parameter of the target data block, or a temporal information parameter of the target data block; and
the subblock indicator information of the subdata blocks includes subblock indicator data for each of the subdata blocks, the subblock indicator data for each of the subdata blocks including at least one of a distortion estimation parameter of the respective subdata block, a spatial information parameter of the respective subdata block, and a temporal information parameter of the respective subdata block.

3. The method according to claim 1, wherein
based on the output value being greater than the first division threshold and the encoding mode being determined as the first mode,
the encoding the target data block comprises:
dividing the target data block into the subdata blocks, and
encoding each of the subdata blocks.

4. The method according to claim 1, wherein
based on the output value being less than or equal to the first division threshold and greater than or equal to the second division threshold,
the determining the encoding mode for the target data block according to the output value includes determining associated block indicator information of at least one associated data block that neighbors the target data block; and
determining the encoding mode for the target data block according to the associated block indicator information.

5. The method according to claim 4, wherein
the associated block indicator information indicates a number of the at least one associated data block that is divided into a plurality of subdata blocks for encoding; and
based on the number of the at least one associated data block being greater than or equal to a first quantity threshold,
dividing the target data block into a plurality of to-be-analyzed subdata blocks,
determining to-be-analyzed subdata block indicator information of the to-be-analyzed subdata blocks based on scene complexities of the to-be-analyzed subdata blocks, and
determining the encoding mode for the target data block according to the to-be-analyzed subdata block indicator information.

6. The method according to claim 5, wherein
the to-be-analyzed subdata block indicator information indicates a number of the to-be-analyzed subdata blocks that meets a further division condition; and
the determining the encoding mode for the target data block according to the to-be-analyzed subdata block indicator information comprises:
determining that the encoding mode is the first mode based on the number of the to-be-analyzed subdata blocks being greater than or equal to a second quantity threshold, and
based on the number of the to-be-analyzed subdata blocks being less than the second quantity threshold, determining the encoding mode for the target data block according to encoding information of the target data block obtained through encoding of the target data block.

7. The method according to claim 5, wherein the determining the encoding mode for the target data block according to the associated block indicator information further comprises:
determining the encoding mode for the target data block according to encoding information of the target data block obtained through encoding of the target data block based on the number of the at least one associated data block being less than the first quantity threshold.

8. The method according to claim 6, wherein
the encoding information of the target data block includes an encoding distortion parameter of the target data block; and
the determining the encoding mode for the target data block according to the encoding information of the target data block comprises:
obtaining an encoding parameter based on the encoding distortion parameter of the target data block and a quantization parameter of the target data block;
determining that the encoding mode is the second mode based on the encoding parameter being less than a third division threshold;
based on the encoding parameter being greater than or equal to the third division threshold,
dividing the target data block into the subdata blocks, and
determining the encoding mode for the target data block according to the encoding information of the target data block and encoding information of the subdata blocks obtained through encoding of the subdata blocks.

9. The method according to claim 8, wherein
the encoding information of the target data block includes a first encoding rate distortion loss parameter of the target data block; the encoding information of the subdata blocks includes a second encoding rate distortion loss parameter of the subdata blocks, the second encoding rate distortion loss parameter being based on a third encoding rate distortion loss parameter of each of the subdata blocks; and
the determining the encoding mode for the target data block according to the encoding information of the target data block and the encoding information of the subdata blocks comprises:
determining that the encoding mode for the target data block is the first mode based on the first encoding rate distortion loss parameter being greater than or equal to the second encoding rate distortion loss parameter; and
determining that the encoding mode for the target data block is the second mode based on the first encoding rate distortion loss parameter being less than the second encoding rate distortion loss parameter.

10. A video processing apparatus, comprising:
processing circuitry configured to:
obtain a target video frame from a video;
determine a target data block from the target video frame;
determine data block indicator information of the target data block based on a scene complexity of the target data block;
divide the target data block into a plurality of subdata blocks;
determine subblock indicator information of the subdata blocks based on scene complexities of the subdata blocks;
determine an encoding mode for the target data block as (i) a first mode when an output value is greater than a first division threshold, or (ii) a second mode when the output value is less than a second division threshold, the output value being calculated by inputting the data block indicator information and the subblock indicator information into a joint statistical model; and
encode the target data block according to the determined encoding mode.

11. The video processing apparatus according to claim 10, wherein
the data block indicator information of the target data block includes at least one of a distortion estimation parameter of the target data block, a spatial information parameter of the target data block, or a temporal information parameter of the target data block; and
the subblock indicator information of the subdata blocks includes subblock indicator data for each of the subdata blocks, the subblock indicator data for each of the subdata blocks including at least one of a distortion estimation parameter of the respective subdata block, a spatial information parameter of the respective subdata block, and a temporal information parameter of the respective subdata block.

12. The video processing apparatus according to claim 10, wherein based on the output value being greater than the first division threshold, the processing circuitry is configured to:
determine that the encoding mode is the first mode;
divide the target data block into the subdata blocks, and encode each of the subdata blocks.

13. The video processing apparatus according to claim 10, wherein based on the output value being less than or equal to the first division threshold and greater than or equal to the second division threshold, the processing circuitry is configured to:
determine associated block indicator information of at least one associated data block that neighbors the target data block; and
determine the encoding mode for the target data block according to the associated block indicator information.

14. The video processing apparatus according to claim 13, wherein
the associated block indicator information indicates a number of the at least one associated data block that is divided into a plurality of subdata blocks for encoding; and
based on the number of the at least one associated data block being greater than or equal to a first quantity threshold, the processing circuitry is configured to:
divide the target data block into a plurality of to-be-analyzed subdata blocks,
determine to-be-analyzed subdata block indicator information of the to-be-analyzed subdata blocks based on scene complexities of the to-be-analyzed subdata blocks, and
determine the encoding mode for the target data block according to the to-be-analyzed subdata block indicator information.

15. The video processing apparatus according to claim 14, wherein
the to-be-analyzed subdata block indicator information indicates a number of the to-be-analyzed subdata blocks that meets a further division condition; and
the processing circuitry is configured to:
determine that the encoding mode is the first mode based on the number of the to-be-analyzed subdata blocks being greater than or equal to a second quantity threshold, and
based on the number of the to-be-analyzed subdata blocks being less than the second quantity threshold, determine the encoding mode for the target data block according to encoding information of the target data block obtained through encoding of the target data block.

16. A non-transitory computer-readable storage medium, storing instructions which when executed by a processor cause the processor to perform:
obtaining a target video frame from a video;
determining a target data block from the target video frame;
determining data block indicator information of the target data block based on a scene complexity of the target data block;
dividing the target data block into a plurality of subdata blocks;
determining subblock indicator information of the subdata blocks based on scene complexities of the subdata blocks;
determining an encoding mode for the target data block as (i) a first mode when an output value is greater than a first division threshold, or (ii) a second mode when the output value is less than a second division threshold, the output value being calculated by inputting the data block indicator information and the subblock indicator information into a joint statistical model; and
encoding the target data block according to the determined encoding mode.

* * * * *

UNITED STATES PATENT AND TRADEMARK OFFICE
CERTIFICATE OF CORRECTION

| | | |
|---|---|---|
| PATENT NO. | : 12,155,840 B2 | Page 1 of 1 |
| APPLICATION NO. | : 17/957071 | |
| DATED | : November 26, 2024 | |
| INVENTOR(S) | : Yushan Zheng | |

It is certified that error appears in the above-identified patent and that said Letters Patent is hereby corrected as shown below:

On the Title Page

Item (71), the Applicant city reads as:
Guangdong (CN)

Should read as:
--Shenzhen (CN)--

Signed and Sealed this
Twenty-fifth Day of February, 2025

Coke Morgan Stewart
*Acting Director of the United States Patent and Trademark Office*